United States Patent [19]

James et al.

[11] Patent Number: 4,492,823
[45] Date of Patent: Jan. 8, 1985

[54] DUAL TIMING CIRCUIT FOR TELEPHONE SUBSCRIBER'S INSTRUMENT

[75] Inventors: Miranda L. James, Hartselle; Albert Teater, Huntsville, both of Ala.

[73] Assignee: GTE Business Communication Systems, Northlake, Ill.

[21] Appl. No.: 490,770

[22] Filed: May 2, 1983

[51] Int. Cl.³ .............................................. H04M 1/00
[52] U.S. Cl. ............................. 179/81 R; 179/18 BD
[58] Field of Search ............ 179/81 R, 90 K, 18 BD, 179/18 BE, 99 LC, 99 R, 2 TL, 81 A

[56] References Cited

U.S. PATENT DOCUMENTS 4,387,274  6/1983  Stein et al. ................... 179/81 R X Primary Examiner—Gene Z. Rubinson
Assistant Examiner—James L. Dwyer
Attorney, Agent, or Firm—Robert J. Black; Peter Xiarhos

[57] ABSTRACT

A dual timing circuit for use with a subscriber's telephone circuit operated in response to two manual switch operations to simulate the placement of the subscriber's phone in the "on-hook" condition for two different predetermined periods of time. One "on-hook" period being for the operation of transfer circuitry in an associated PABX and the other period being for the initiation of a new call.

10 Claims, 1 Drawing Figure

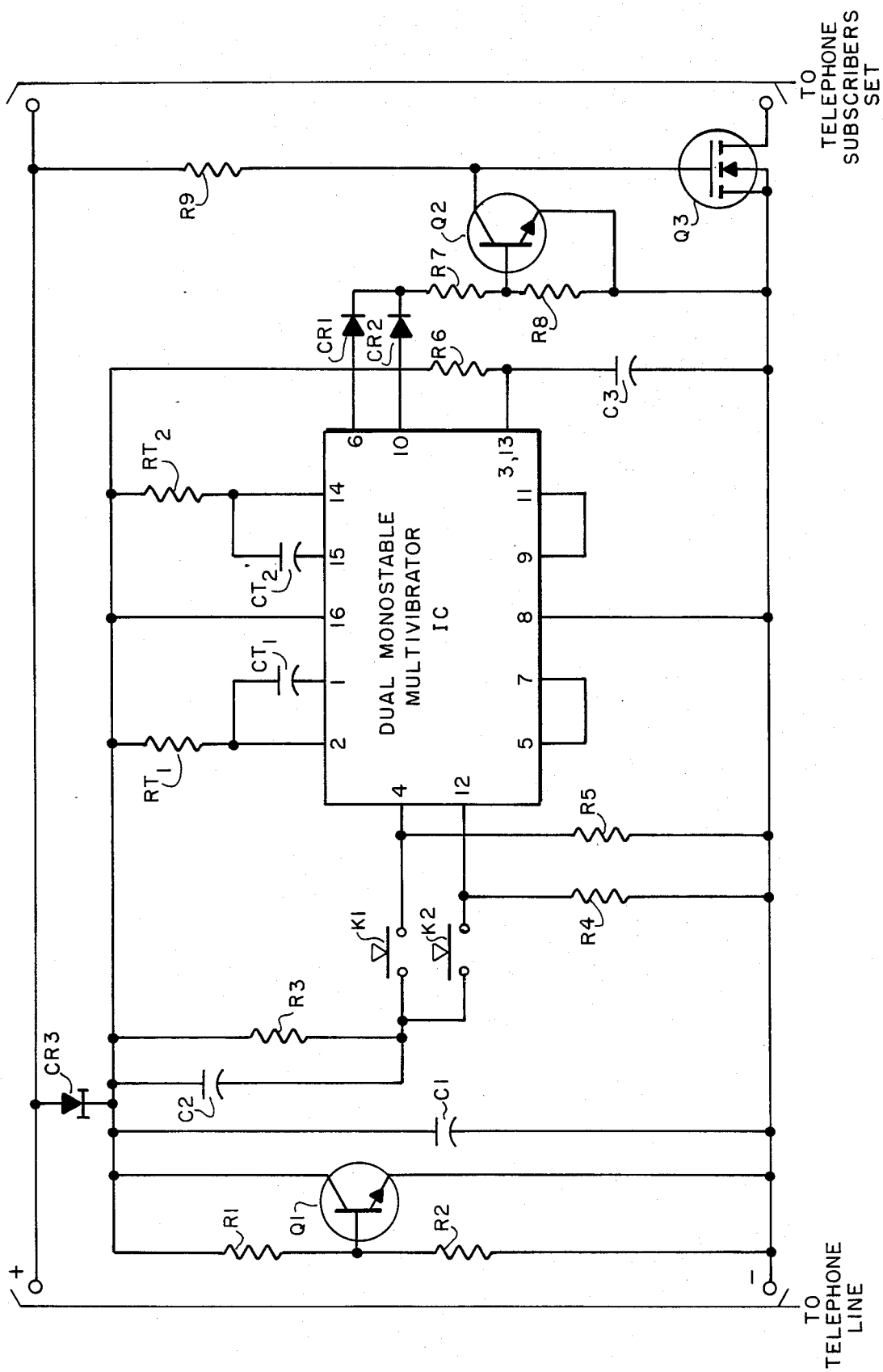

DUAL TIMING CIRCUIT FOR TELEPHONE SUBSCRIBER'S INSTRUMENT

BACKGROUND OF THE INVENTION

1. Technical Field

The present invention relates to subscriber's telephone circuits and more particularly to a dual timing circuit for use with a subscriber's telephone circuit that simulates in response to manual switch operations the placement of the subscriber's telephone "on-hook" for different predetermined periods of time.

2. Background Art

In recent years, demand has been created for electronic communication systems that provide a number of cost effective automated features. Of particular emphasis in this area have been the development of a number of new private automatic branch exchange systems (PABX's) that include a number of built in features not previously available in PABX systems. Many of these features are activated at the subscriber's telephone instrument by means of operation of the hookswitch. Among these features are a call transfer arrangement whereby operating the hookswitch for a defined amount of time, i.e. 300 milliseconds to 800 milliseconds, the PABX may be operated to facilitate transfer from a call from one subscriber's instrument to another within the PABX system. On the other hand if the subscriber wishes to place a new call such PABX's require that the subscriber's set be for a minimum time of three to seven seconds in the "on-hook" condition, to recognize the request and then supply dial tone for the placement of a new telephone call. The current generation of electronic PABX systems will not recognize a new call before this minimum time "on-hook".

In many instances the accurate gauging of the appropriate time to go to the "on-hook" condition for call transfer or for placement of a new call are difficult to judge for the subscriber and therefore a call may be lost rather than transferred or if the person wishes to initiate a new call, the transfer facility may have been activated instead of preparing the system for placement of a new call. Some modern subscriber's instrument incorporating microprocessor control are able to provide such control of the "on-hook" condition however the method for achieving same is costly. Such an instrument is the FEATURE-FONE® telephone manufactured by GTE Business Communications Systems, Incorporated.

Accordingly, it is the object of the present invention to provide a new and improved dual timing circuit for use in a subscriber's telephone circuit wherein response to operation of one of two momentary contact pushbuttons, the "on-hook" condition is achieved for a predetermined period of time, effective to either provide the desired transfer feature or in response to the operation of the other pushbutton provide for the initiation of a new call.

SUMMARY OF THE INVENTION

The timing circuit of the present invention includes: a voltage control circuit which acts to stablize the operating voltage for an integrated circuit that includes dual monostable vibrators which are the heart of the present timing circuit. Included in the voltage control circuit is the energy storage circuitry that provides the necessary power for the timing circuit while the telephone instrument is "on-hook" which in turn receives power from the telephone line and stores operating potential within the timing control circuit while the telephone instrument is "off-hook".

The monostable multivibrators are triggered by a subcircuit whose inputs include manually operated switches and internal circuitry that inhibits false triggering related to contact bounce found in mechanical switching elements. The output signals from the dual monostable multivibrator are logically OR'ed by means of a gating circuit whose output in turn is coupled to a switching device connected to the telephone line, which simulates hookswitch operation. Also included is a reset circuit that insures stabilization of the multivibrator circuitry after operation by delaying the input signal to the multivibrator for three seconds.

BRIEF DESCRIPTION OF THE DRAWINGS

The single FIGURE of the attached drawing is a combination block and schematic diagram of a dual timing circuit for use in a subscriber's telephone in accordance with the present invention.

DESCRIPTION OF THE PREFERRED EMBODIMENT

Referring now to the attached drawing, transistor Q1, capacitor C1, current regulating diode CR3 and resistors R1 and R2 comprise an energy storage and voltage regulator subcircuit. This subcircuit is utilized to stablize the operating voltage of the integrated circuit IC. Dual precision monostable multivibrator IC is an integrated circuit unit and comprises a commercially available unit identified as 4538 IC and available from such manufacturers as National Semiconductor and RCA. Providing input to the multi-vibrator integrated circuit is a trigger subcircuit which includes two momentary contact push keys K1 and K2, a resistor/capacitor debounce timing circuit including capacitor C2 and resistor R3 and two tie down resistors R4 and R5. The circuitry associated with the push keys K1 and K2 acts as a debounce subcircuit inhibiting false triggering due to spikes usually caused by contact closure bounce.

Connected to the output of the dual monostable multivibrator integrated circuit IC is a subcircuit that performs an ORing function consisting of diodes CR1 and CR2, transistor Q2 and resistors R7 and R8. The output of this circuit taken from the collector of transistor Q2 is used to control the operation of the switching device Q3 which in the present application is a VMOS device including a circuit connection to resistor R9. Under control of transistor Q2 the switching device Q3 simulates the open circuit or "on-hook" condition in response to actuation.

As noted above, the voltage regulator subcircuitry referred to previously stablizes the operating voltage for the integrated circuit IC. The disclosed circuitry is powered from capacitor C1 while the telephone instrument is "on-hook" during the timing cycle. Capacitor C1 is thus charged while the telephone instrument is "off-hook" through current regulating diode CR3. This regulating diode provides the present circuitry with isolation from the telephone voice network. The voltage regulating portion of the circuit consisting of resistances R1, R2 and transistor Q3 isolates the circuitry from voltages due to different telephone line lengths while "off-hook" and maintains a constant voltage level at the capacitor C1 while in the timing cycle.

The multivibrator unit IC is a dual precision monostable multivibrator CMOS integrated circuit with appropriate supporting wiring and timing controls. The device is wired so that a contact closure will be recognized if the multivibrators are not currently in one of their timing cycles. When the device is in a timing cycle, contact closures will not be recognized. Since the integrated circuit IC has two sections (it is a dual device) the same circuitry is shared by both the FLASH (K1) and NEW CALL (K2) feature buttons. The resistors RT1 and RT2 and capacitors CT1 and CT2 set the timing for the two different timing cycles.

The trigger subcircuitry as noted above comprises a "debounce" resistor/capacitor subcircuit consisting of capacitor C2 and resistor R3 with the two tie down resistors R4 and R5. This subcircuitry keeps the integrated circuit IC from false triggering due to spikes caused by contact bounce on switches K1 and K2. The tie down resistors R4 and R5 give the integrated circuit IC trigger pins a known value reference thus insuring accurate triggering.

The two output signals from the integrated circuit IC are logically OR'ed together. This OR'ed output signal is used to activate switching device Q3. When the output signal of the integrated circuit IC goes high, transistor Q2 turns on thus turning switching device Q3 off. When the switching device Q3 is turned off, the telephone instrument is then switched off to simulate an "on-hook" condition. When the output signal of the integrated circuit is low, transistor Q2 will remain off simulating an open drain or "off-hook" condition. This allows the voice network, the signalling circuit and the ringer circuit which are all a part of the standard or basic telephone instrument, to operate when the FLASH/NEW CALL circuitry is nonoperational. For example, during the FLASH/NEW CALL network initial power up period, while the integrated circuit IC is being reset, the telephone voice network and the basic telephone instrument associated therewith are operational.

Also associated with the integrated circuit IC is a reset subcircuit consisting of the resistor-capacitor combination that includes resistor R6 and capacitor C3. This circuit allows the integrated circuit IC to power up and then stablize, resetting integrated circuit IC into an operational ready state. The reset circuit creates a delayed high input signal of approximately three seconds to the multivibrator IC to power and subsequently stabilize.

By means of the above circuitry, a subscriber on operating the FLASH pushbutton (K1) will activate the timing circuit to place the telephone "on-hook" for the 300-800 milliseconds necessary to actuate the call transfer feature found in modern PABXs. If the subscriber wishes to place a new call the NEW CALL button (K2) is operated causing the simulation of an "on-hook" condition for from 3-7 seconds so that associated PABX switching system will recognize it as a request for a new call and thus provide dial tone after which dialing can commence. In either situation, it is not necessary for the subscriber to return the handset to the hookswitch or to operate the hookswitch in a manual operation.

A more extensive understanding of the present invention may be had from the following sequence of operation wherein: The telephone instrument is powered by the telephone line when the handset is removed in the usual manner from the cradle. The capacitors in the FLASH/NEW CALL timing circuit begin to charge at this time. Between 1.8 seconds to 5.0 seconds after the handset is removed from the cradle, storage capacitor C1 stores the minimum energy required to operate the timing circuitry. During the circuit power up time of 1.8 to 5.0 seconds, the standard telephone circuitry (voice circuit and dial circuitry) are operational due to the open drain at Q3. It is during this time that the reset subcircuitry including capacitor C3 and resistor R6 activate the integrated circuit reset pin to place the integrated circuit IC in the ready state. The timing circuit is now functional.

Once the FLASH button K1 or the NEW CALL button K2 are pushed, the leading edge of the resulting contact closure triggers the integrated circuit to begin its timing. The integrated circuit IC timing is controlled by capacitor-resistor combinations of RT1/CT1 and RT2/CT2. During this timing cycle, the IC output pin will go high turning the associated transistor Q2 on and turning switch Q3 off. The voltage regulating subcircuitry maintains the voltage at a steady level as the storage capacitor C1 powers the circuit during the timing cycle. When the timing cycle ends the integrated circuit IC output pin resumes its low output level thus turning the transistor Q2 off and the switching device Q3 will remain on.

While but a single embodiment of the present invention has been shown it will be obvious to those skilled in the art that numerous modifications can be made without departing from the spirit of the present invention which shall be limited only by the scope of the claims appended hereto.

What is claimed is:

1. A timing circuit for use with a subscriber's telephone instrument connected to a telephone line, said timing circuit comprising: a first monostable multivibrator operable for a first predetermined period of time and including a first input and first output; a second monostable multivibrator operable for a second predetermined period of time and including a second input and a second output; switching means connected to said telephone line; gating means connected between said switching means and said first and second outputs; first trigger means connected to said first monostable multivibrator, said first monostable multivibrator operated to generate a signal at said first output for a first predetermined period of time in response to the manual operation of said first trigger means; second trigger means connected to said second monostable multivibrator, said second monostable multivibrator operated to generate a signal at said second output for a second predetermined period of time in response to the manual operation of said second trigger means; said gating means operated in response to said signal at said first output to operate said switching means to simulate at said telephone line an "on-hook" condition for said first predetermined period of time and alternately said gating means operated in response to said signal at said second output to operate said switching means to simulate at said telephone line an "on-hook" condition for said second predetermined period of time.

2. A timing circuit as claimed in claim 1 wherein: said first and said second monostable multivibrators are each included in a common integrated circuit unit.

3. A timing circuit as claimed in claim 1 wherein: said first and said second trigger means each include a manually operable momentary contact switch.

4. A timing circuit as claimed in claim 3 wherein: said timing means further include a delay circuit comprising a resistor-capacitor combination and each of said switches include a circuit connection to a different one of said monostable multivibrators and a circuit connection to a source of biasing potential.

5. A timing circuit as claimed in claim 1 wherein: said gating means comprise a transistor including an output connected to said switching means and an input; and first and second unidirectional conducting means each connected between a different one of said multivibrator outputs and said transistor input.

6. A timing circuit as claimed in claim 1 wherein: said switching means comprise a VMOS device.

7. A timing circuit as claimed in claim 1 wherein: there is further included voltage control means connected between said telephone line and said timing circuit.

8. A timing circuit as claimed in claim 7 wherein: said voltage control means include regulator means comprising a current regulator diode.

9. A timing circuit as claimed in claim 7 wherein: said voltage control means further include potential storage means comprising a capacitor.

10. A timing circuit as claimed in claim 1 wherein: there is further included a reset circuit comprising a resistor-capacitor combination connected to said first and second monostable multivibrators.

* * * * *